(12) United States Patent
Jeffryes

(10) Patent No.: US 11,066,918 B2
(45) Date of Patent: Jul. 20, 2021

(54) METHODS AND SYSTEMS FOR USE WITH A POSITIVE DISPLACEMENT MOTOR

(71) Applicant: SCHLUMBERGER TECHNOLOGY CORPORATION, Sugar Land, TX (US)

(72) Inventor: Benjamin Peter Jeffryes, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 183 days.

(21) Appl. No.: 16/096,829

(22) PCT Filed: Apr. 19, 2017

(86) PCT No.: PCT/US2017/028216
§ 371 (c)(1),
(2) Date: Oct. 26, 2018

(87) PCT Pub. No.: WO2017/189284
PCT Pub. Date: Nov. 2, 2017

(65) Prior Publication Data
US 2019/0128108 A1    May 2, 2019

(30) Foreign Application Priority Data
Apr. 26, 2016   (GB) .................................... 1607212

(51) Int. Cl.
*E21B 47/00*   (2012.01)
*E21B 4/02*   (2006.01)
(Continued)

(52) U.S. Cl.
CPC ................ *E21B 47/00* (2013.01); *E21B 4/02* (2013.01); *G01P 3/02* (2013.01); *G01P 3/44* (2013.01); *E21B 21/08* (2013.01)

(58) Field of Classification Search
CPC .................................. E21B 47/00; E21B 4/02
See application file for complete search history.

(56) References Cited

U.S. PATENT DOCUMENTS 5,744,723 A    4/1998   Piety
6,087,796 A    7/2000   Canada et al.
(Continued)

OTHER PUBLICATIONS

Combined Search and Examination Report under Sections 17 and 18(3) for UK Patent Application No. GB1607212.6, dated Oct. 20, 2016, 8 pages.
(Continued)

*Primary Examiner* — Robert E Fuller
*Assistant Examiner* — Lamia Quaim

(57) ABSTRACT

A method for determining a rotational frequency of a positive displacement motor positioned in a downhole portion of a drill string, the method including: providing at least one measurement device for measuring a property of a part of the drill string; providing a processor for processing a signal output by the at least one measurement device; operating the positive displacement motor whilst the part of the drill string is in a non-driven state; receiving the signal at the processor; determining, using the processor, a frequency spectrum of the signal; and determining the rotational frequency of the positive displacement motor by: identifying a peak in the frequency spectrum in a pre-determined frequency range associated with an expected rotational frequency of the positive displacement motor; and/or identifying a peak in the frequency spectrum having a pre-determined peak width associated with an expected rotational frequency of the positive displacement motor.

20 Claims, 9 Drawing Sheets

(51) Int. Cl.
  *G01P 3/02* (2006.01)
  *G01P 3/44* (2006.01)
  *E21B 21/08* (2006.01)

(56) References Cited

U.S. PATENT DOCUMENTS

| | | |
|---|---|---|
| 6,142,228 A | 11/2000 | Jogi et al. |
| 2004/0158416 A1 | 8/2004 | Slates |
| 2014/0028293 A1 | 1/2014 | Johnson et al. |
| 2015/0060141 A1 | 3/2015 | Leuenberger et al. |

OTHER PUBLICATIONS

Examination Report under Section 18(3) for UK Patent Application No. GB1607212.6, dated Sep. 3, 2019, 4 pages.
Communication and Extended European Search Report for EP Patent Application No. 17790125.3, dated Nov. 26, 2019, 7 pages.
International Search Report and Written Opinion for corresponding PCT Application Serial No. PCT/US2017/028216, dated Jul. 26, 2017, 17 pages.
Examination Report under Section 18(3) for UK Patent Application No. 1607212.6, dated Feb. 12, 2020, 4 pages.
Communication 94(3) EPC and Examination Report issued in European Patent Application 17790125.3 dated May 7, 2020, 4 pages.

METHODS AND SYSTEMS FOR USE WITH A POSITIVE DISPLACEMENT MOTOR

The present document is based on and claims priority to GB Application Serial No.: 1607212.6, filed Apr. 26, 2016, which is incorporated herein by reference in its entirety.

DESCRIPTION OF INVENTION

Embodiments of this invention relate to methods for determining a rotational frequency of a positive displacement motor positioned in a downhole portion of a drill string and associated systems.

The use of motors in wellbore drilling operations is well known. One type of motor employed in such operations is known as a positive displacement motor. A positive displacement motor typically has a stator having an inner surface formed by an elastomeric casting. The inner surface is helical-shaped and is characterised by its number of lobes. A rotor is provided for rotation within the stator and the rotor has a complementary helical-shape but with one fewer lobes than the stator. In this way, there are a number of cavities defined between the inner surface of the stator and the rotor. During operation, drilling fluid is transmitted to the positive displacement motor and effects rotation of the rotor relative to the stator by passing through consecutive cavities before being discharged downstream of the positive displacement motor. The rotor will exhibit eccentric rotation within the stator.

Generally, a positive displacement motor is used to drive rotation of a drill bit. The drill bit shaft is suitably coupled to the lower end of the rotor through, for example, a universal joint coupling, to convert eccentric rotation of the rotor into rotary movement of the drill bit.

The rotational speed of the drill bit is extremely important in managing drilling operations. Manufacturers of positive displacement motors provide characteristic curves of various operation parameters so that operators can determine the rotational frequency of the rotor and hence determine the rotational speed of the drill bit. During operation, the rotational speed would be calculated by measuring drilling fluid flow rate and pressure drop across the positive displacement motor and then comparing those measurements against the characteristic curves provided by the manufacturer. However, such methods are not particularly accurate because downhole conditions can vary considerably and therefore cause the rotational frequency to deviate from the characteristic curves.

Alternative methods for determining the rotational frequency of a positive displacement motor during drilling operations are known. These include measuring downhole data related to the drill string and performing frequency analysis on that data. U.S. Pat. No. 6,142,228 teaches one such method. The method involves taking downhole data measurements during drill string rotation and operation of the positive displacement motor. Subsequent frequency analysis is conducted and various computation steps are performed to determine the rotational frequency because the rotational frequency is not directly observable from the frequency analysis alone.

There is a need for a method for determining the rotational frequency of a positive displacement motor with fewer computation steps being required.

Accordingly, an aspect of the present invention provides a method for determining a rotational frequency of a positive displacement motor positioned in a downhole portion of a drill string, the method including: providing at least one measurement device for measuring a property of a part of the drill string; providing a processor for processing a signal output by the at least one measurement device; operating the positive displacement motor whilst the part of the drill string is in a non-driven state; receiving the signal at the processor; determining, using the processor, a frequency spectrum of the signal; and determining the rotational frequency of the positive displacement motor by: identifying a peak in the frequency spectrum in a pre-determined frequency range associated with an expected rotational frequency of the positive displacement motor; and/or identifying a peak in the frequency spectrum having a pre-determined peak width associated with an expected rotational frequency of the positive displacement motor.

The property may be vibrational motion of the part of the drill string.

The property may be lateral motion of the part of the drill string.

The property may be axial motion of the part of the drill string.

The property may be tangential motion of the part of the drill string.

The at least one measurement device may be an accelerometer.

The property may be angular motion of the part of the drill string.

The at least one measurement device may be a gyroscope/gyrometer, preferably a rate gyroscope/gyrometer for sensing the rate of change of the angular motion.

The at least one measurement device may be a magnetometer.

The property may be deformation of the part of the drill string.

The least one measurement device may be a strain gauge.

The method may include the steps of: providing a plurality of measurement devices for measuring different properties of the part of the drill string; and selectively providing the processor with a signal output by one of the plurality of measurement devices.

The step of determining, using the processor, a frequency spectrum of the signal may include performing one of a Fourier transform, wavelet transform, sine transform or cosine transform on the signal.

The method may include the step of: providing a section of pipe for connecting to the drill string above the positive displacement motor, wherein the section of pipe is asymmetric with respect to a longitudinal axis of the drill string.

The at least one sensor or the plurality of sensors may be provided on the drill string.

Another aspect provides a method for determining a rotational frequency of a positive displacement motor positioned in a downhole portion of a drill string, the method including: receiving a signal from at least one measurement device for measuring a property of a part of the drill string during operation of the positive displacement motor whilst the part of the drill string is in a non-driven state; determining a frequency spectrum of the signal; and determining the rotational frequency of the positive displacement motor by: identifying a peak in the frequency spectrum in a pre-determined frequency range associated with an expected rotational frequency of the positive displacement motor; and/or identifying a peak in the frequency spectrum having a pre-determined peak width associated with an expected rotational frequency of the positive displacement motor.

The method may further include controlling the operation of one or more aspects of the drill string in response to the determined rotational frequency.

The method may further include determining whether the part of the drill string is in a non-driven state and outputting the rotational frequency of the positive displacement motor at a first rate when it is determined that the drill string is in a non-drive state and at a second rate when it is determined that the drill string is in a driven state, wherein the second rate is lower than the first rate.

Another aspect provides a system for determining a rotational frequency of a positive displacement motor positioned in a downhole portion of a drill string using a method as above.

Another aspect provides a non-transitory computer readable medium including instructions for a processor which, when executed, cause the processor to perform a method of determining a rotational frequency of a positive displacement motor positioned in a downhole portion of a drill string including: receiving a signal from at least one measurement device for measuring a property of a part of the drill string during operation of the positive displacement motor whilst the part of the drill string is in a non-driven state; determining a frequency spectrum of the signal; and determining the rotational frequency of the positive displacement motor by: identifying a peak in the frequency spectrum in a pre-determined frequency range associated with an expected rotational frequency of the positive displacement motor; and/or identifying a peak in the frequency spectrum having a pre-determined peak width associated with an expected rotational frequency of the positive displacement motor.

Embodiments of the invention will now be described, by way of example only, with reference to the following figures, of which:

Figure 1A:
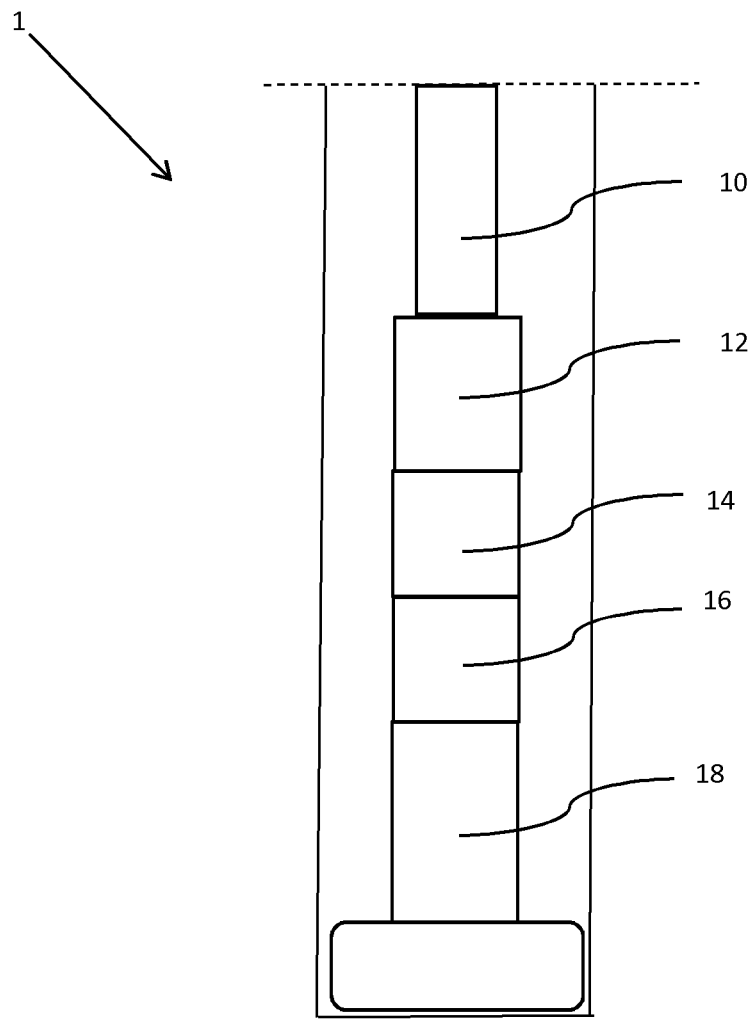
FIGS. 1a and 1b are schematic drawings showing a system for use with some embodiments of the invention.
Figure 1B:
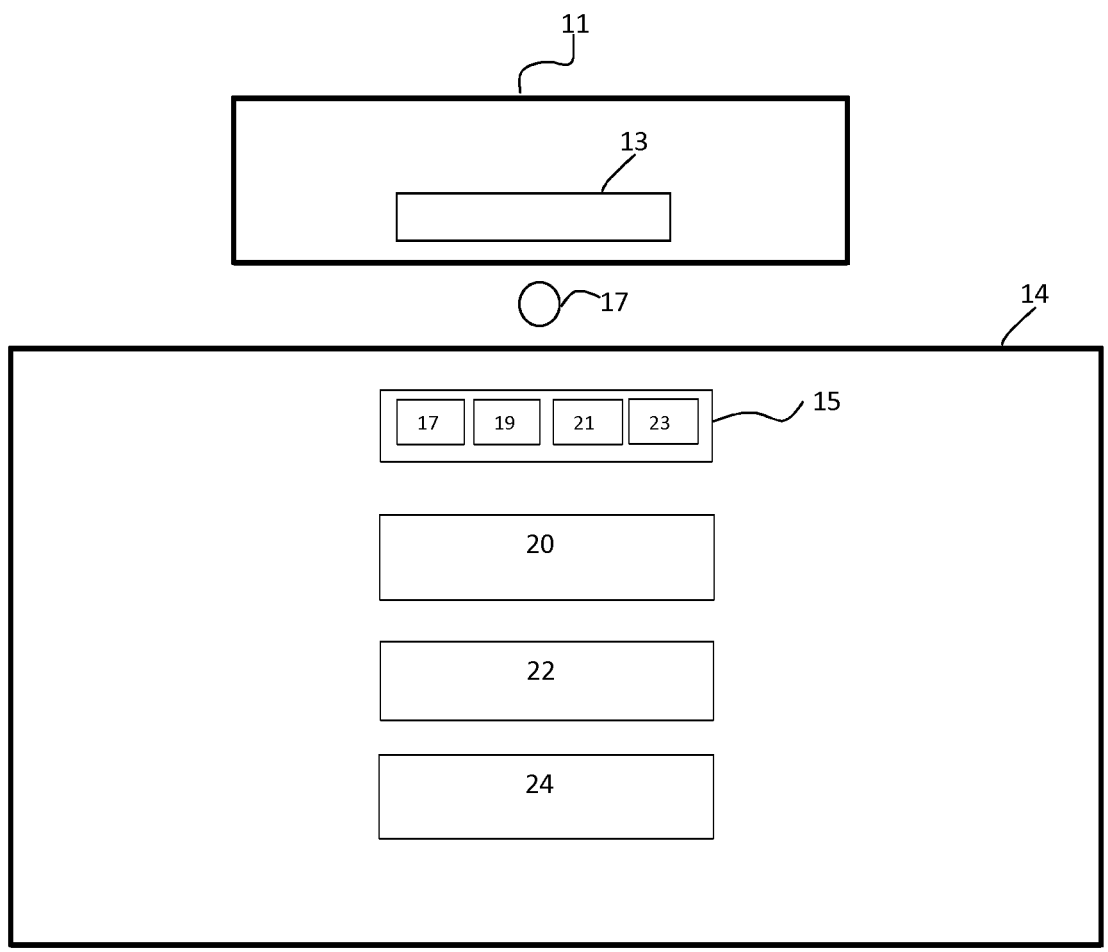

Referring to FIG. 1, a bottom hole assembly 1 is shown downhole. The bottom hole assembly 1 includes a drill string 10 which extends from a ground surface and is connected to a system 11 above the ground surface for controlling operation of the drill string, e.g. driving rotation of the drill string and pumping drilling fluid through the drill string. Such systems are well known in the art and so will not be described in detail; however, it should be noted that the ground surface may be a surface (such as a seabed) covered by a body of water, or not.

The drill string 10 includes a downhole portion which may have a drill collar 12, and which includes a measurement device assembly 14 and a positive displacement motor 16. The positive displacement motor 16 may be coupled to a drill bit 18 for driving rotation of the drill bit. Operation of the positive displacement motor 16 is effected by transmitting drilling fluid thereto from the ground surface through the drill string 10.

In some embodiments, the drill string may be connected to a top drive 13 at the surface which is operable to drive rotation of the drill string 10 to enable advancement of the drill string 10. In some embodiments, other mechanisms are provided to drive rotation of the drill string 10.

Figure 2:
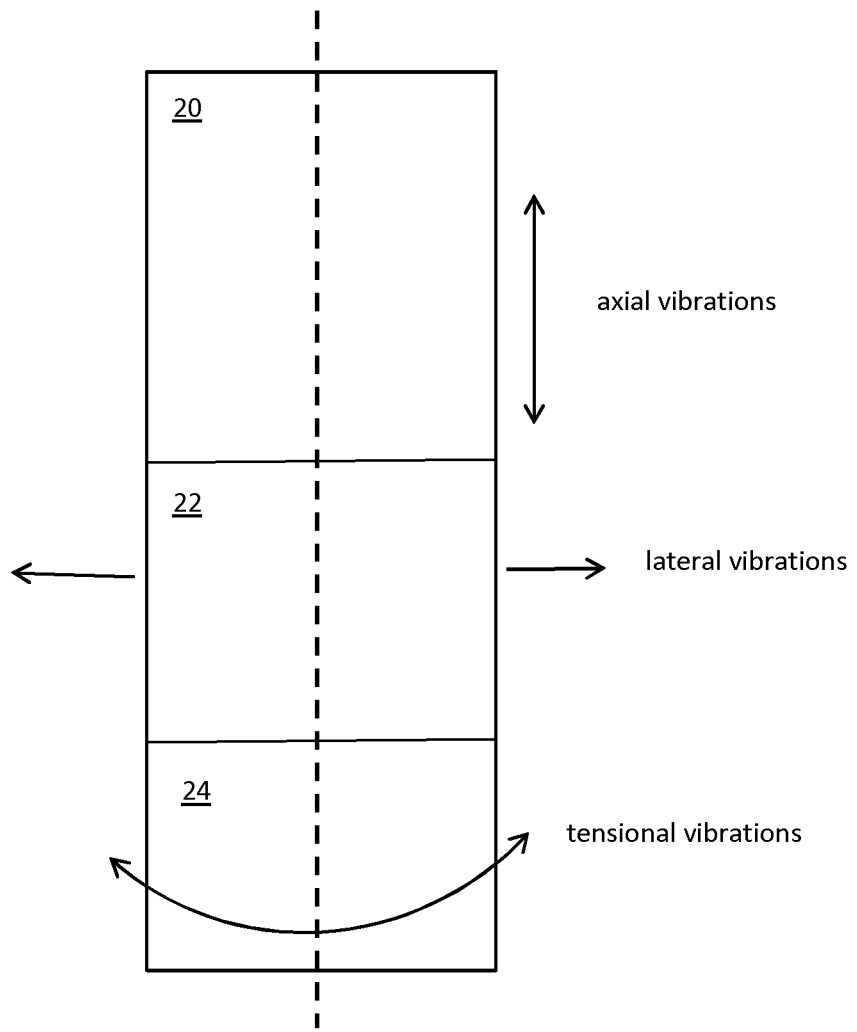
FIG. 2 is a schematic drawing showing a measurement device assembly for use with some embodiments of the invention.

The measurement device assembly 14 may include one or more measurement devices for measuring one or more properties of a part of the drill string 10. The term "property" is used to denote any characteristic of the drill string 10 which is related to motion of the part of the drill string 10. For example, the property may be vibrational motion of at least part of the drill string 10. FIG. 2 illustrates a number of properties that may be measured by one or more of the measurement devices such as lateral vibration, axial vibration and torsional vibration.

The or each measurement devices may include at least one accelerometer 20, and/or magnetometer 22 and/or strain gauge 24. The or each accelerometer 20 may measure lateral and/or tangential acceleration with respect to a longitudinal axis of the drill string 10. The or each magnetometer 22 may measure the magnetic field along at least one axis (which may be along two orthogonal axes) so as to determine angular motion of the part of the drill string 10. The or each strain gauge 24 may measure torque and/or deformation, i.e. bending, of the part of the drill string 10 in at least one axis and may be in at least two orthogonal axes.

The or each measurement device may include at least one pressure measurement device for measuring the pressure of fluid flowing through or around the part of the drill string 10.

The measurement device assembly 14 may include a computer device 15 having a processor 17, input channels 21 for receiving signals, and output channels 23 for outputting signals. The drill string 10 may include a telemetry communications system 19 for enabling communication between the computer device and the measurement device assembly 14 and may enable communication with a system at the ground surface.

The computer device may be configured to operate in accordance with instructions for controlling operation of the measurement devices and processing signals received therefrom to perform a method for determining a rotational frequency of the positive displacement motor.

Embodiments of the method will now be described with reference to FIGS. 3 to 8 which relate to data from a drill string 10 through measurement of different properties of the part of the drill 10.

Irrespective of which one or more properties are measured, the method may be performed by transmitting drilling fluid from the ground surface through to the positive displacement motor 16 whilst the drill string 10 is a non-driven state. In other words, the drill string 10 is not rotating (driven by the top drive 13 or otherwise).

Accordingly, the positive displacement motor 16 may rotate in response to the drilling fluid being transmitted therethrough and may effect rotation of the drill bit 18. During this operation, instructions may be transmitted to the computer device from the ground surface to determine the rotational frequency of the positive displacement motor 16 and transmit a signal to the system at the ground surface including an indication of the rotational frequency of the rotor of the positive displacement motor 16. Such a system may be known as a measurement while drilling (MWD) system.

The rate at which the indication of the rotational frequency is transmitted to the ground surface may depend on whether the drill string 10 is being rotated from the ground surface or not. This may be based on, for example, the average rotation speed of the downhole portion of the drill string 10 (i.e. the downhole system including portion including the positive displacement motor 16). Embodiments of the present invention may be configured to transmit the indication to the ground surface when it has determined that the drill string 10 is not being rotated from the ground surface. Embodiments may be configured not to transmit the indication (or reduce the rate of transmission) when it has determined that the drill string 10 is being rotated from the ground surface. In these instances the rate of transmission refers to the number of indications which are transmitted over a given period of time.

Based on the instructions received, the computer device may be configured to operate the or each measurement device to measure the required property of the part of the drill string 10 and receive a respective signal indicative of the property outputted therefrom.

The computer device may be configured to process the received signal and determine a frequency spectrum of the received signal. In some embodiments the frequency spectrum is determined by a Fourier transform method which may be a fast Fourier transform method. In some embodiments other methods may be used to determine the frequency spectrum. This may include any of a sine transform method, a cosine transform method and a wavelet transform method. FIGS. 3 to 8 show frequency spectra determined from various signals indicative of the properties indicated below during a drilling operation using the measurement device assembly 14 of the drill string 10.

Figure 3:
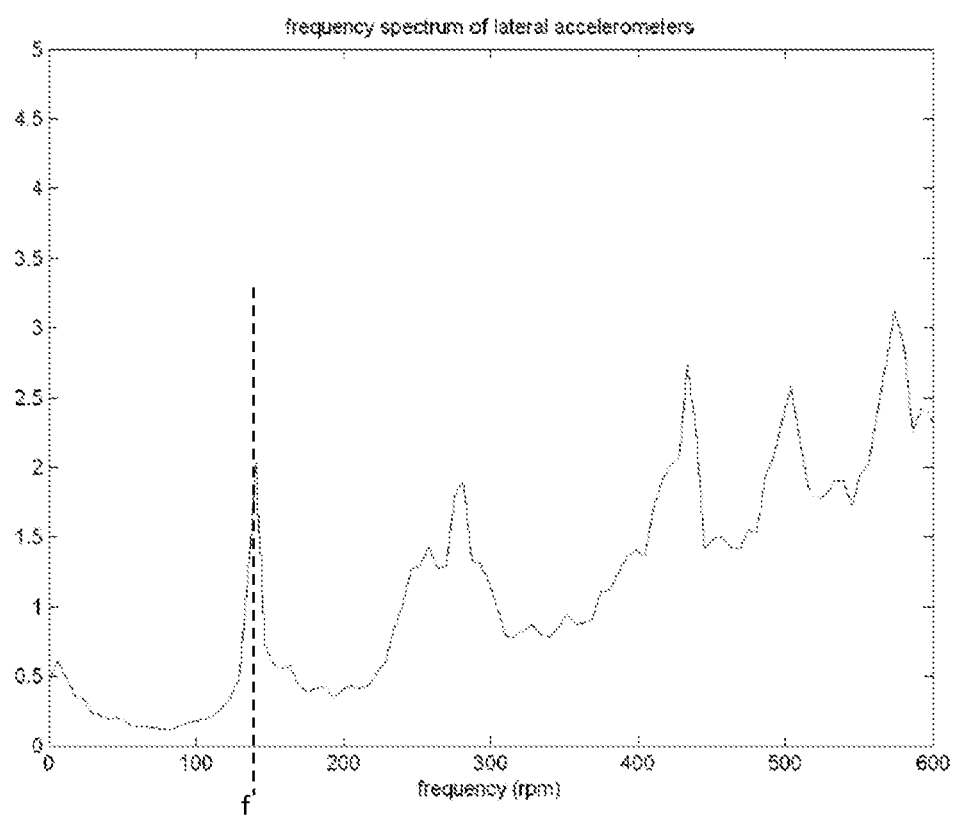
FIGS. 3 to 8 are frequency spectra obtained from measurements made on a downhole portion of a drill string.

FIG. 3 is a frequency spectrum for a lateral acceleration (measured by a lateral accelerometer) of the part of the drill string 10.

Figure 4:
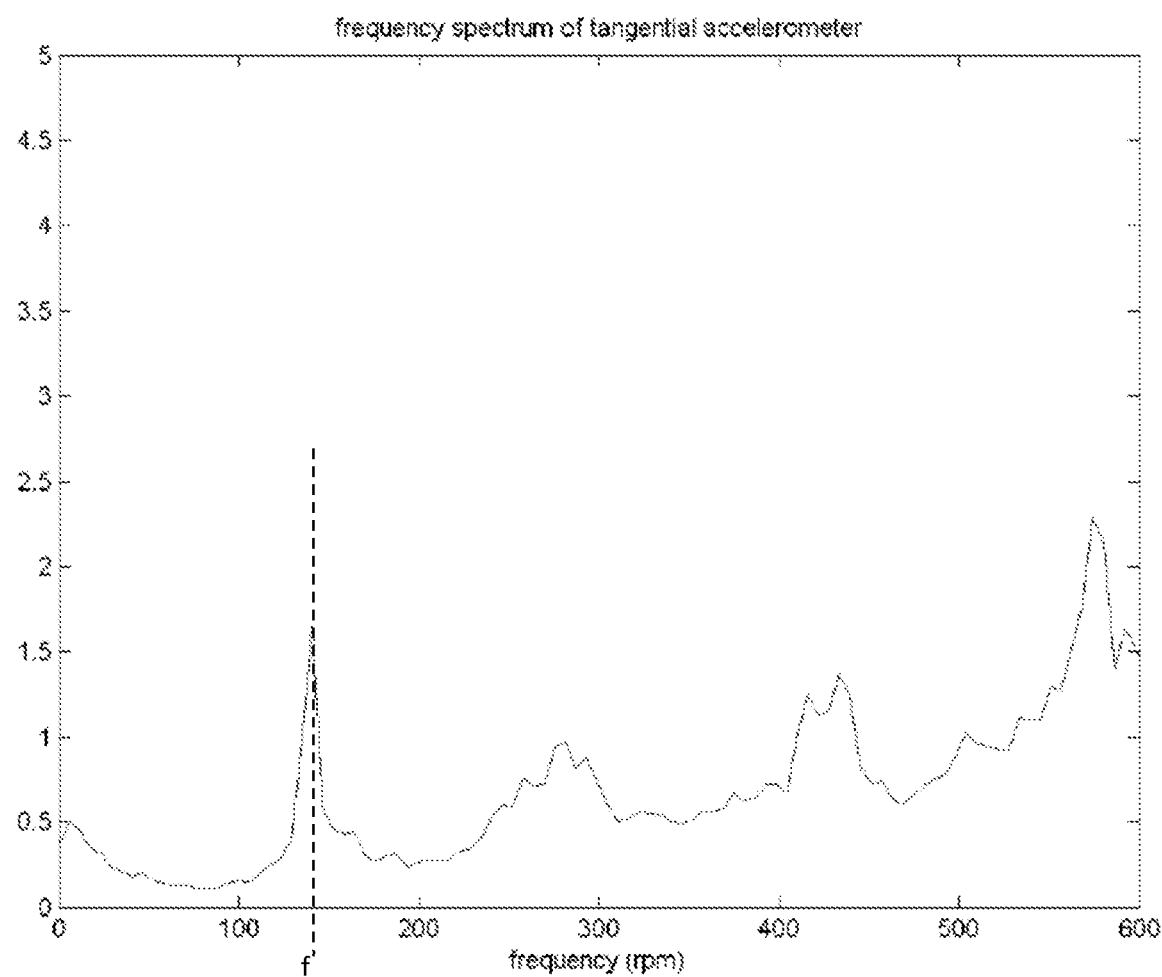

FIG. 4 is a frequency spectrum for a tangential acceleration (measured by a tangential accelerometer) of the part of the drill string 10.

Figure 5:
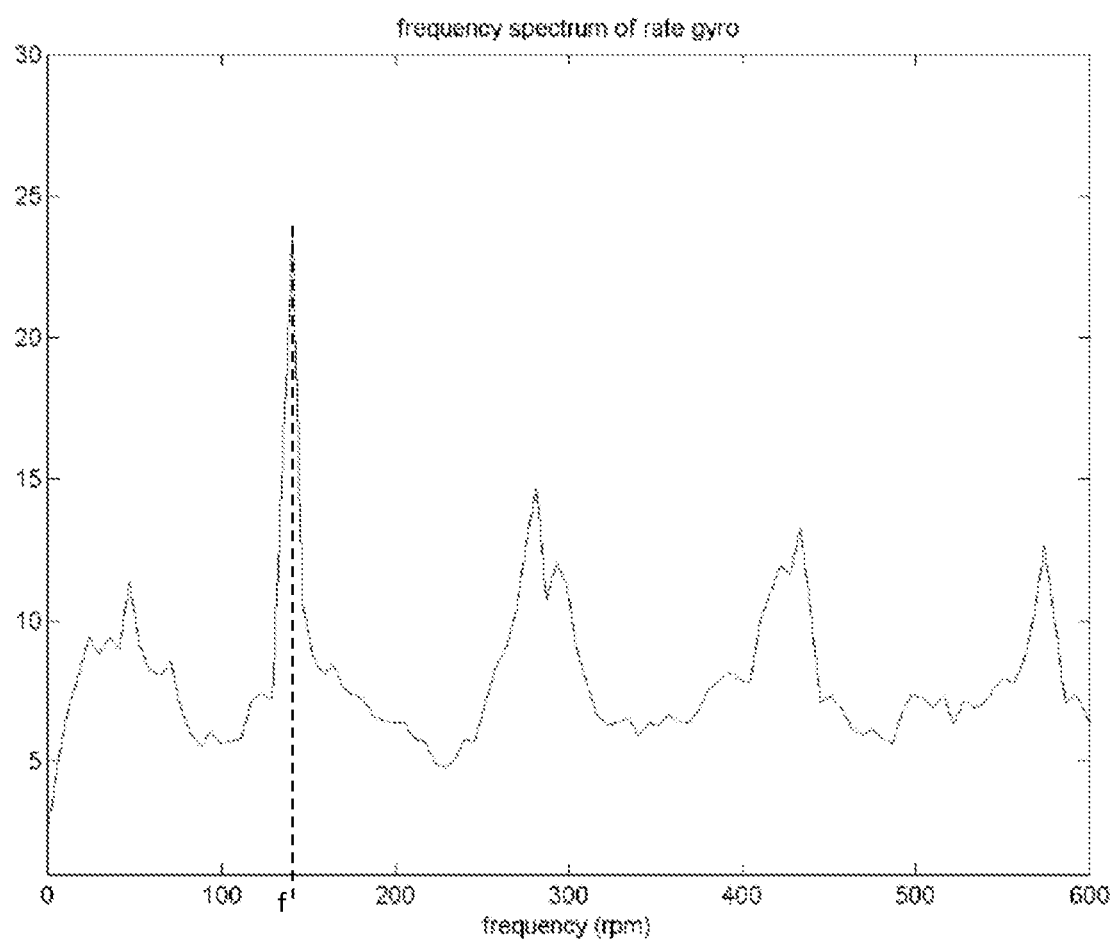

FIG. 5 is a frequency spectrum for an angular acceleration (measured by a rate gyrometer/gyroscope) of the part of the drill string 10.

Figure 6:
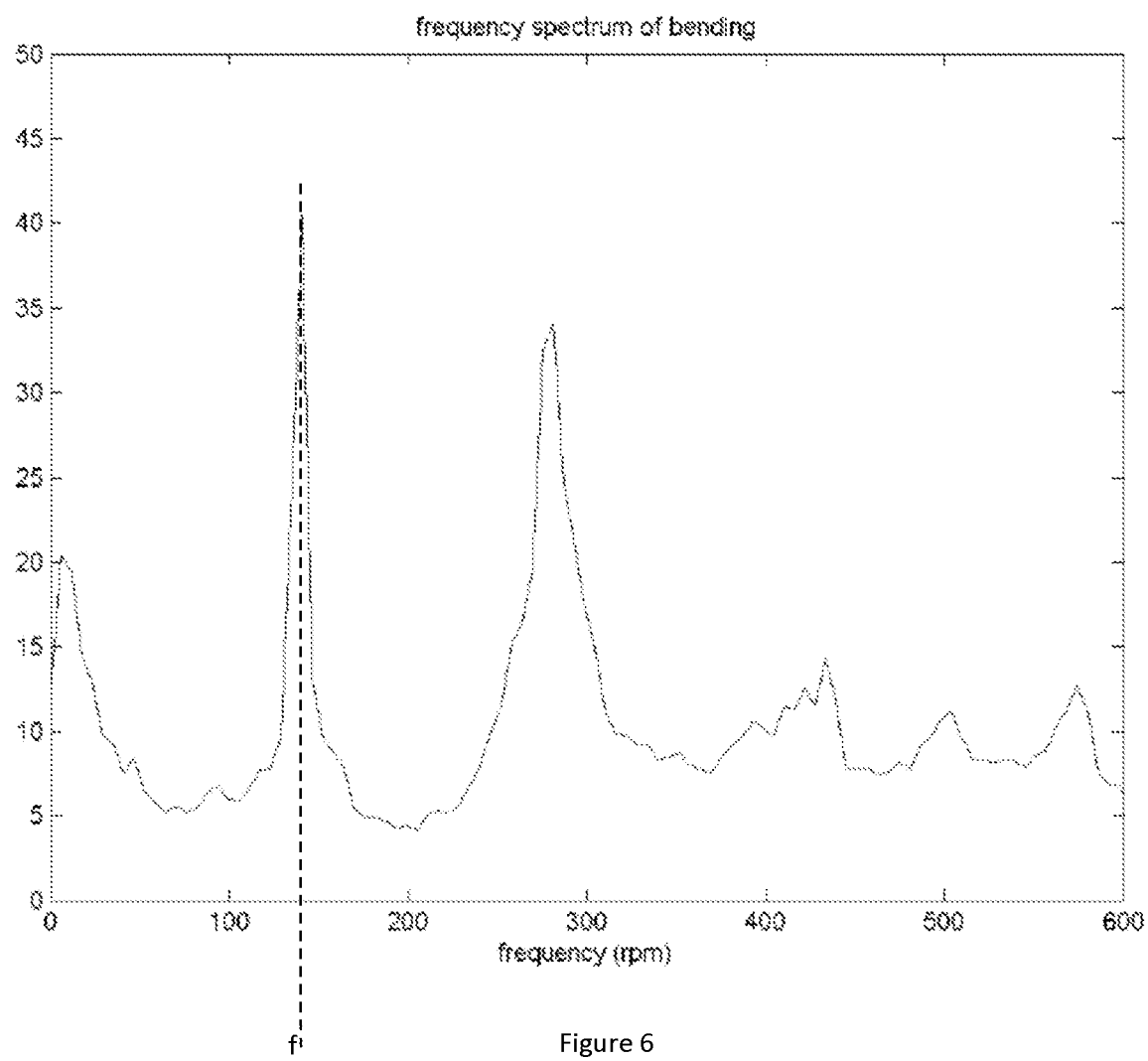

FIG. 6 is a frequency spectrum for a deformation or bending (measured by a strain gauge) of the part of the drill string 10.

Figure 7:
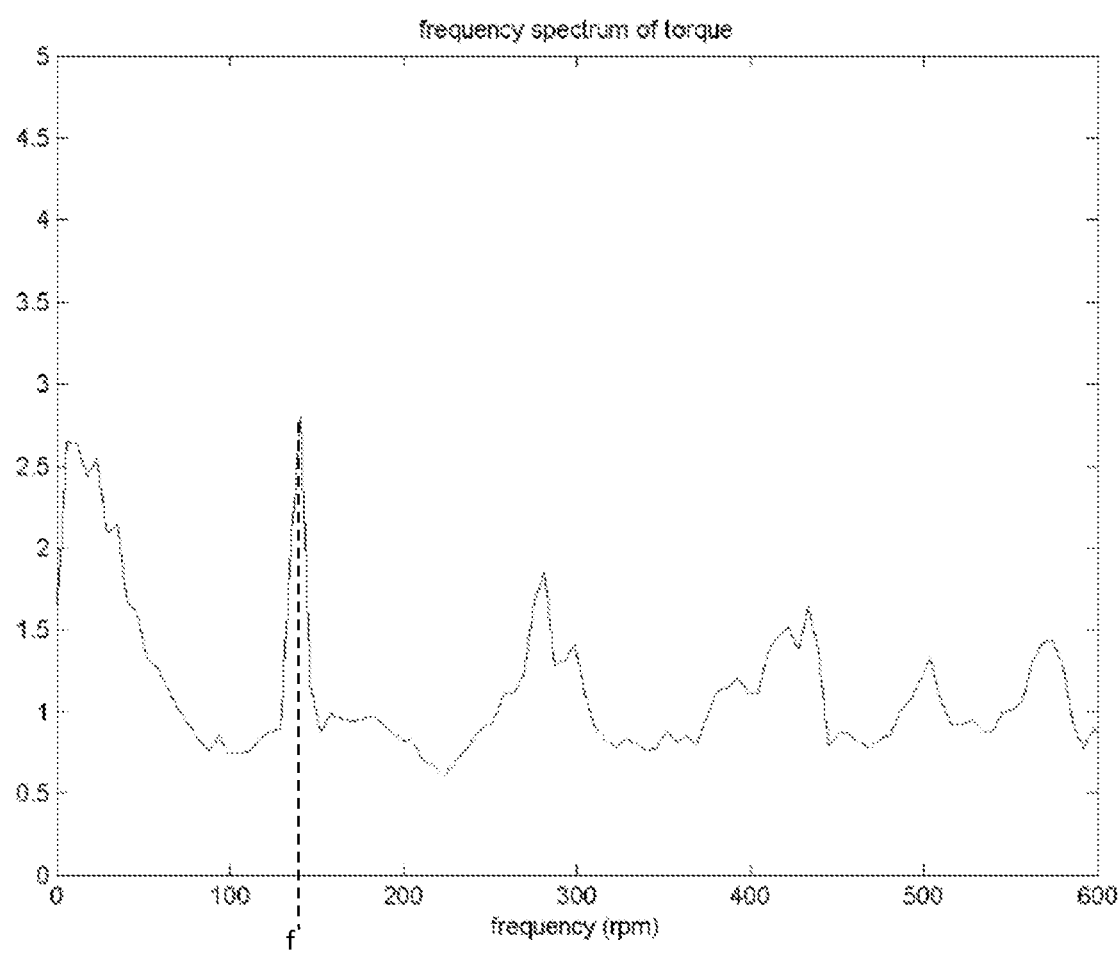

FIG. 7 is a frequency spectrum for a torque (measured by a strain gauge) experienced by the part of the drill string 10.

Figure 8:
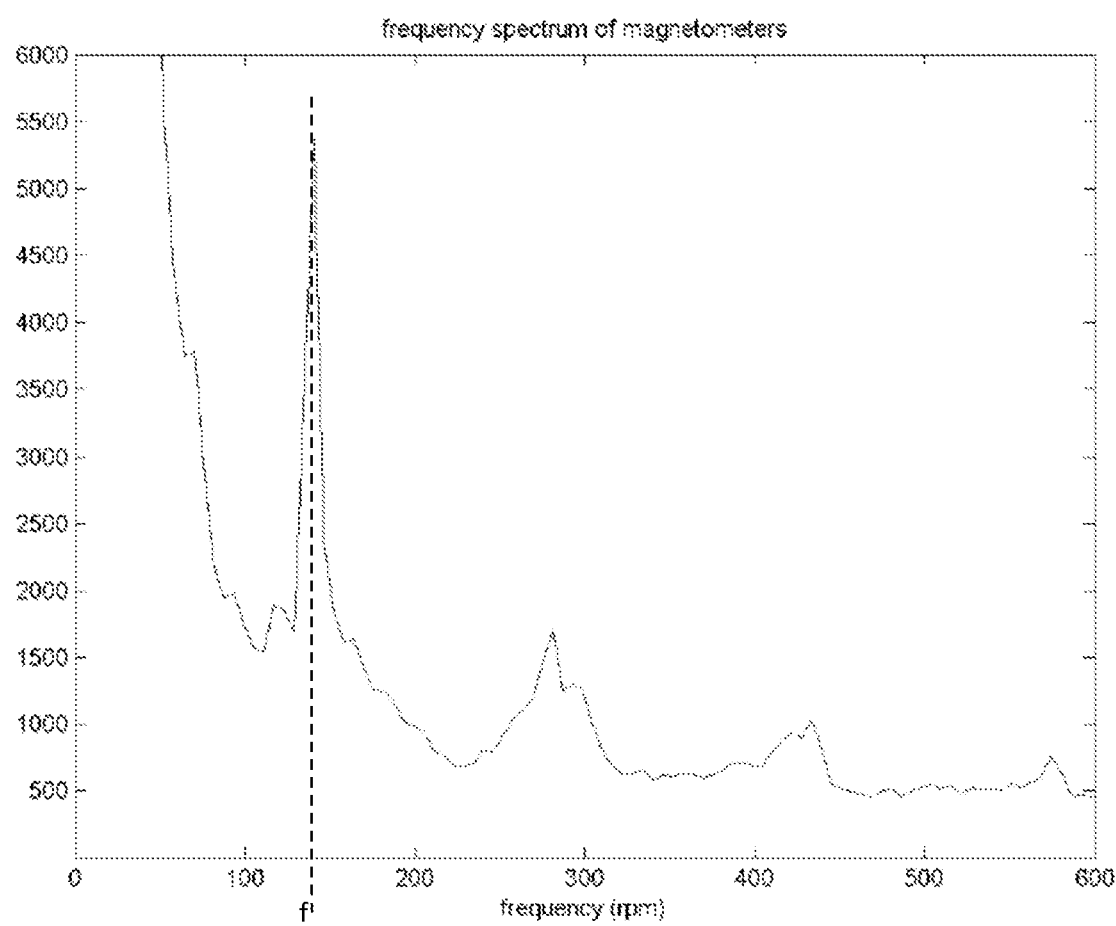

FIG. 8 is a frequency spectrum for an azimuthal motion (measured by a magnetometer) of the part of the drill string 10.

The positive displacement motor 16 is expected to have a rotational frequency that lies in a pre-determined range. The pre-determined range will be around expected rotational frequency, e.g. as indicated on a specification sheet or a characteristic curve, provided by the manufacturer of the positive displacement motor 16. The present inventor has discovered that there will be a peak in the frequency spectrum at about the actual rotational frequency and that this peak will lie in the pre-determined range. The computer device may be configured to identify that peak by analysing the frequency spectrum in the pre-determined range.

In the present example, the pre-determined range is between 100 and 200 (r.p.m.) revolutions per minute and it can be seen that there is a clear peak at 140 r.p.m. in all of the frequency spectra (FIGS. 3 to 8). This corresponds to the rotational frequency of the positive displacement motor 16. The computer device is configured to determine the rotational frequency by identifying the peak in the pre-determined range from the relevant frequency spectrum and transmits this information to the system on the surface.

Peaks in the frequency spectra associated with the rotational frequency of the positive displacement motor are typically much narrower in width compared to other frequencies in a drilling system. This can be seen in the frequency spectra FIGS. 3 to 8. In embodiments, the peak associated with the rotational frequency may be determined by estimating the width of the various peaks in a frequency spectrum and removing peaks whose width is outside of a pre-determined peak width that would be associated with the expected rotational frequency. This is particularly advantageous when determining the position of a peak which lies below the sampling interval of the spectrum.

The determined peak may represent the rotational frequency and so identification of a peak associated with or at the rotational frequency may allow that rotational frequency to be determined.

It has been surprisingly found that an advantageously clear signal is obtained through use of a rate gyrometer/gyroscope (i.e. a "gyro") to measure the angular acceleration or speed. Similarly, the signal obtained by the strain gauge, in some embodiments, to measure the amount of deformation/bend of the part of the drill string 10 has been found particularly clear for use in identifying the peak associated with the rotational frequency. It can be seen from the figures that the peak associated with the rotational frequency has the largest amplitude in the respective frequency spectrum determined from the rate gyrometer/gyroscope (FIG. 5) and the strain gauge (FIG. 4). In embodiments, identification of the peak associated with the rotational frequency involves determining the largest amplitude peak in the frequency spectrum.

In embodiments, a combination of one or more or all of the above described techniques for determining the rotational frequency may be utilised based on a number of factors, e.g. clarity of signal, peak amplitudes and peak widths.

In embodiments, the computer device may be configured to identify noise in the frequency spectrum, e.g. a background trend, and/or may be configured to use a filter (such as a median filter) to provide a filtered frequency spectrum from which to determine the rotational frequency more easily.

Once the rotational frequency of the positive displacement motor has been determined, operation of the drill string may be adjusted to optimise drilling performance, i.e. by adjusting system parameters such as drilling fluid pressure, drilling fluid flow rate and rotational speed of the drill bit. The rotational frequency may also be used to diagnose potential problems during operation. For example, if the rotational frequency is much higher or lower than expected, then this could be indicative of particular downhole conditions which require adjustment of the operation of the drill string to compensate and/or may indicate a malfunction in the downhole equipment.

In embodiments, it has been found that the method is surprisingly effective when the drill string 10 is provided with a section of pipe which is asymmetric with respect to the elongate axis of the rest of the drill string (which may be the central longitudinal axis of the drill string). A bent sub may be incorporated as part of a housing of the positive displacement motor 16. In some embodiments, the housing bend may be adjustable so that the shape of the motor housing can be altered.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method for determining a rotational frequency of a positive displacement motor positioned in a downhole portion of a drill string, the method comprising:
   providing at least one measurement device for measuring a property of a part of the drill string;
   providing a processor for processing a signal output by the at least one measurement device, the signal including measurements of the property;
   operating the positive displacement motor while the part of the drill string is in a non-driven state;
   receiving the signal at the processor;
   determining, using the processor, a frequency spectrum of the measurements of the property in the signal; and
   determining the rotational frequency of the positive displacement motor by identifying a peak in the frequency spectrum of the measurements of the property from the signal and based upon a comparison of one or more widths of peaks in the frequency spectrum compared to a pre-determined peak width.

2. The method of claim 1, wherein the property is vibrational motion of the part of the drill string.

3. The method of claim 1, wherein the property is lateral motion of the part of the drill string.

4. The method of claim 1, wherein the property is axial motion of the part of the drill string.

5. The method of claim 1, wherein the property is tangential motion of the part of the drill string.

6. The method of claim 1, wherein the at least one measurement device is an accelerometer.

7. The method of claim 1, wherein the property is angular motion of the part of the drill string.

8. The method of claim 7, wherein the at least one measurement device is a rate gyroscope/gyrometer for sensing the rate of change of the angular motion.

9. The method of claim 7, wherein the at least one measurement device is a magnetometer.

10. The method of claim 1, wherein the property is deformation of the part of the drill string.

11. The method of claim 10, wherein the least one measurement device is a strain gauge.

12. The method of claim 1, further comprising:
    providing a plurality of measurement devices for measuring different properties of the part of the drill string; and
    selectively providing the processor with a signal output by one of the plurality of measurement devices.

13. The method of claim 1, wherein the step of determining, using the processor, a frequency spectrum of the signal comprises performing on the signal one of a Fourier transform, a wavelet transform, a sine transform, or a cosine transform.

14. The method of claim 1, comprising:
    providing a section of pipe for connecting to the drill string above the positive displacement motor, wherein the section of pipe is asymmetric with respect to a longitudinal axis of the drill string.

15. The method of claim 1, wherein the at least one measurement device is provided on the drill string.

16. A method for determining a rotational frequency of a positive displacement motor positioned in a downhole portion of a drill string, the method comprising:
    receiving a signal from at least one measurement device for measuring a property of a part of the drill string during operation of the positive displacement motor while the part of the drill string is in a non-driven state;
    determining a frequency spectrum of the measured property in the signal; and
    determining the rotational frequency of the positive displacement motor by identifying a peak in the frequency spectrum associated with an expected rotational frequency of the positive displacement motor and by comparing one or more widths of peaks in the frequency spectrum to a pre-determined peak width.

17. The method of claim 16, further comprising:
    controlling the operation of one or more aspects of the drill string in response to the determined rotational frequency.

18. The method of claim 16, further comprising:
    determining whether the part of the drill string is in a non-driven state and outputting the rotational frequency of the positive displacement motor at a first rate when it is determined that the drill string is in a non-driven state and at a second rate when it is determined that the drill string is in a driven state, wherein the second rate is lower than the first rate.

19. A system for determining a rotational frequency of a positive displacement motor positioned in a downhole portion of a drill string configured to perform the method of claim 16.

20. The method of claim 1, wherein determining the rotational frequency of the positive displacement motor further includes identifying a peak in the frequency spectrum of the measurements of the property from the signal and within a pre-determined frequency range associated with an expected rotational frequency of the positive displacement motor.

* * * * *